US012718102B2

(12) United States Patent
Chen et al.

(10) Patent No.: US 12,718,102 B2
(45) Date of Patent: Aug. 25, 2026

(54) LOW-RANK ADAPTATION OF NEURAL NETWORK MODELS

(71) Applicant: Microsoft Technology Licensing, LLC, Redmond, WA (US)

(72) Inventors: Weizhu Chen, Kirkland, WA (US); Jingfeng Hu, Redmond, WA (US); Yelong Shen, Redmond, WA (US); Shean Wang, Sammamish, WA (US); Yabin Liu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 949 days.

(21) Appl. No.: 17/325,117

(22) Filed: May 19, 2021

(65) Prior Publication Data

US 2022/0383126 A1 Dec. 1, 2022

(51) Int. Cl.
*G06N 3/084* (2023.01)
*G06N 3/10* (2006.01)
*G06N 5/04* (2023.01)

(52) U.S. Cl.
CPC ............... *G06N 3/084* (2013.01); *G06N 3/10* (2013.01); *G06N 5/04* (2013.01)

(58) Field of Classification Search
CPC ............ G06N 3/084; G06N 3/10; G06N 5/04; G06N 3/04; G06N 3/082
See application file for complete search history.

(56) References Cited

U.S. PATENT DOCUMENTS

2014/0019388 A1* 1/2014 Kingsbury ............... G06N 3/08 706/12
2020/0265196 A1 8/2020 Ravi et al.

OTHER PUBLICATIONS

Authors: Hutchinson et al. Title: A Sparse Plus Low-Rank Exponential Language Model for Limited Resource Scenarios Date: Mar. 2015 (Year: 2015).*
Authors: Choromanski & Colwell Title: Rethinking Attention with Performers Date: Oct. 23, 2020 (Year: 2020).*
Authors: Zhao et al Title: Low-Rank Plus Diagonal Adaptation for Deep Neural Networks Published: May 19, 2016 (Year: 2016).*
Hu, et al., “LoRA: Low-Rank Adaptation of Large Language Models”, In repository of arxiv code: 2106.09685v2 [cs.CL], Oct. 16, 2021, 26 Pages.
Mao, et al., “LadaBERT: Lightweight Adaptation of BERT through Hybrid Model Compression”, In repository of arxiv code: 2004.04124v2 [cs.CL], Oct. 21, 2020, 10 Pages.
“International Search Report and Written Opinion Issued in PCT Application No. PCT/US22/026611”, Mailed Date: Aug. 9, 2022, 15 Pages.

(Continued)

*Primary Examiner* — David Yi
(74) *Attorney, Agent, or Firm* — Schwegman Lundberg & Woessner, P.A.

(57) ABSTRACT

A computer implemented method obtains neural network-based model base model weight matrices for each of multiple neural network layers. First low-rank factorization matrices are added to corresponding base model weight matrices to form a first domain model. The low-rank factorization matrices are treated as trainable parameters. The first domain model is trained with first domain specific training data without modifying base model weight matrices.

20 Claims, 5 Drawing Sheets

(56) References Cited

OTHER PUBLICATIONS

Pfeiffer, et al., "MAD-X: An Adapter-Based Framework for Multi-Task Cross-Lingual Transfer", In Proceedings of the Conference on Empirical Methods in Natural Language Processing, Nov. 16, 2020, pp. 7654-7673.

Aghajanyan, et al., "Intrinsic Dimensionality Explains the Effectiveness of Language Model Fine-Tuning", In Repository of arXiv:2012.13255v1, Dec. 22, 2020, pp. 1-11.

Brown, et al., "Language Models are Few-Shot Learners", In Repository of arXiv:2005.14165v4, Jul. 22, 2020, 75 Pages.

Houlsby, et al., "Parameter-Efficient Transfer Learning for Nlp", In Repository of arXiv:1902.00751v2, Jun. 13, 2019, 13 Pages.

Li, et al., "Prefix-Tuning: Optimizing Continuous Prompts for Generation", In Repository of arXiv:2101.00190v1, Jan. 1, 2021, 15 Pages.

Radford, et al., "Language Models are Unsupervised Multitask Learners", In Journal of OpenAI Blog, vol. 1, Issue 8, Feb. 24, 2019, 24 Pages.

Rajpurkar, et al., "Know what you don't know: Unanswerable questions for squad", In Journal of Computing Research Repository, Jun. 2018, 9 Pages.

Reddy, et al., "CoQA: A Conversational Question Answering Challenge", In Journal of Computing Research Repository, Aug. 21, 2018, 16 Pages.

Williams, et al., "A Broad-Coverage Challenge Corpus for Sentence Understanding through Inference", In Proceedings of the Conference of the North American Chapter of the Association for Computational Linguistics: Human Language Technologies, vol. 1, Jun. 1, 2018, pp. 1112-1122.

Zhong, et al., "Seq2SQL: Generating Structured Queries from Natural Language using Reinforcement Learning", In Journal of Computing Research Repository, Aug. 31, 2017, 13 Pages.

Communication pursuant to Article 94(3) EPC received in European Application No. 22724541.2, mailed on Nov. 13, 2025, 9 pages.

First Office Action Received for Chinese Application No. 202280036502.2, mailed on Mar. 11, 2026, 08 pages. (English Translation Provided).

* cited by examiner

LOW-RANK ADAPTATION OF NEURAL NETWORK MODELS

BACKGROUND

Large, pre-trained neural network-based language general models have changed what natural language processing (NLP) systems are capable of and how they are used. Large models have demonstrated that task performances continue to improve as the model size increases. However, fully fine-tuning a general model for a specific task or domain requires storing as many parameters in the fine tuned model as in the original general model. As pretrained models grow larger, this presents a challenge for storing different task-specific models and switching between them in a production setting.

When fine-tuned models are deployed as a service for different tasks, an extreme cost is incurred when switching the fine-tuned models for the different tasks. Sharing expensive processing resources between tasks and switching between the task specific models requires loading a very large checkpoint to VRAM every time. Such switching can be a slow and resource-intensive operation. In other words, conventional fine-tuning does not scale when working with enormous pre-trained models.

Previously, there have been proposals to adapt only some parameters or to learn external modules for new tasks. In practice, they either introduce inference latency or reduce the model's usable sequence length. These prior attempts also often fail to match fine-tuning baseline results, posing a tradeoff between efficiency and model quality.

SUMMARY

A computer implemented method obtains neural network-based model base model weight matrices for each of multiple neural network layers. First low-rank factorization matrices are added to corresponding base model weight matrices to form a first domain model. The low-rank factorization matrices are treated as trainable parameters. The first domain model is trained with first domain specific training data without modifying base model weight matrices.

DETAILED DESCRIPTION

Figure 1:
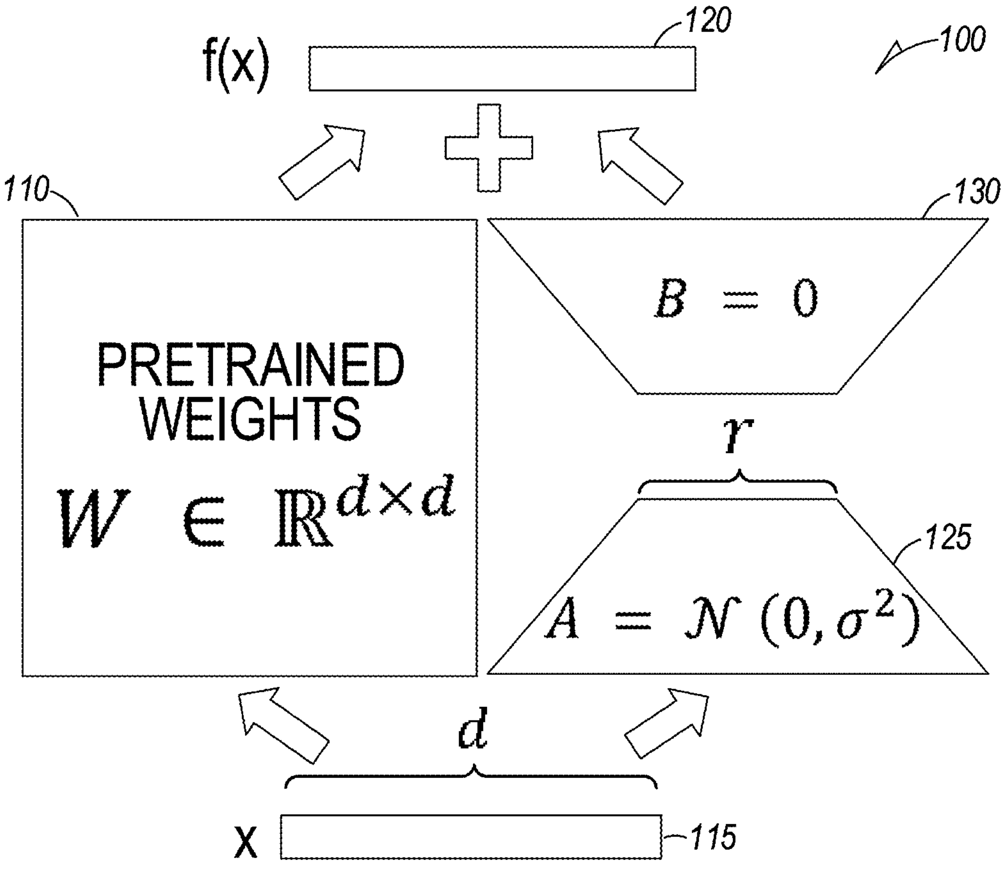
FIG. 1 is a block diagram illustrating the training of a dense layer of a model neural network to adapt a general model to a specific task or domain according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

The dominant paradigm of deep learning consists of large-scale pre-training on general domain data and adaptation to particular tasks or domains. As pre-trained models grow nearly ten times larger every few months, conventional fine-tuning, which retrains all model parameters, becomes less feasible. Prior attempts to adapt models adapt only some parameters or learn external modules for new tasks. In practice, these attempts either introduce inference latency or reduce the model's usable sequence length. These prior attempts also often fail to match the fine-tuning baseline, posing a tradeoff between efficiency and model quality. The inventors have recognized that the update matrices obtained by adapting overparametrized models on specific tasks are rank-deficient and leveraged that recognition using low rank adaptation (LoRA) with decomposition matrices injection.

An improved system utilizes low rank adaptation (LoRA) for neural network-based models to adapt a general model for a specific task or domain. The weights in the general model are frozen, and small low-rank factorization matrices are injected into all or some weight matrices of the layers of the general model to form a specific model adapted to the specific task or domain. In one example described herein, the model comprises a natural language processing model. However, low-rank factorization matrices may be injected into other neural network models to adapt them to specific tasks and domains in further examples.

FIG. 1 is a block diagram illustrating the training of a dense layer 100 of a language model neural network to adapt a general model with a matrix of pretrained weights 110 for processing an input vector x at 115 with a function f(x) at 120. In one example, the language model may be a transformer-based deep learning language model. The pretrained weights 110 are in the form of a matrix having dimension of d×d resulting from the overall network being trained on general domain data. The input vector x at 115 is a token representing a word or other language component and also has a dimension of d. The input vector is also processed by a pair of rank decomposition matrices, matrix A 125 and matrix B 130. Matrix A 125 receives the d length input vector x 115 and converts it to a vector of length r. Matrix B 130 receives the vector of length r and coverts it back to a vector of length d, where it is combined with the result of the pretrained weight 110 matrix to provide f(x), the input to the next layer in the neural network. Matrices A and B may be referred to as adaptation matrices, as they adapt the general model to the specific task or domain.

LoRA allows the training of each of multiple dense layers in the neural network indirectly by injecting and optimizing their rank decomposition matrices A and B, while keeping the original matrices of pretrained weights 110, unchanged. In practice, a very low rank suffices even when the full rank is high, making LoRA both space- and compute-efficient.

LoRA possesses several key advantages. A single pre-trained model can be shared and used to build many small adaptations for different tasks. This makes training more efficient, since there is no need to calculate the gradients or maintain the optimization states of the enormous original model during training. The shared original model may be kept in VRAM (volatile random access memory) or other selected memory while efficiently switching the significantly smaller LoRA model comprising stacked matrices A and B, greatly improving processor utilization.

Unlike full fine-tuning, the use of the adaptation matrices does not erode the capability of the original model for the general domain since a bypass of the adapted model falls back to the original model. The use of the adaptation matrices allows combining the update matrices with the original weights during deployment, thus introducing no inference latency. Adapting a large pre-trained model to specific tasks can be performed while optimizing very few parameters for the adaptation matrices. Compared to conventional fine-tuning, this lowers the hardware barrier for training and significantly reduces the serving cost, without adding inference latency.

In one example, the length of the input token and hence the width of the weights 110 matrix, d=10,000. The number of trainable parameters for weights 110 matrix |W|=d^2=100,000,000. The difference in size and hence in number of operations is illustrated by the following where r, the rank, is much smaller than d. The number for the adaptation matrices is=|A|+|B|=d*r+r*d=2*10,000*8=160,000 trainable parameters. Typical values for r, range from greater than one to less than 100 in current popular language models. Future, larger neural network models may utilize an r that is larger. The rank, r, may be determined empirically in practice.

The general problem of adapting general domain models is now described to help illustrate the technical problems solved by the use of adaptation matrices. Consider adapting a pre-trained large-scale language model to conditional text generation tasks, such as summarization, machine reading comprehension (MRC), and natural language to SQL (NL2SQL), etc., where the training instances are context and target pairs: $\{(x_i,y_i)\}i=1, \ldots, N$; both $x_i$ and $y_i$ are sequences of tokens. For example, $x_i$ is the natural language query and $y_i$ is the SQL in the task of converting the natural language to a structured sequence language query, referred to as NL2SQL.

In the classic adaptation framework, the model is initialized with pre-trained parameters $\Phi_0$, and fine-tuned to $\Phi'$ by maximizing the conditional language modeling objective:

$$\Phi' = \text{argmax}_{\Phi}\sum_{i=1}^{N}\sum_{t=1}^{|y_i|}\log p_{\Phi}(y_{i,t} \mid x_i,\, y_i,\, <t) \tag{1}$$

N is the number of examples, and equation (1) operates to generate a correct token given an input and the known output.

The classic fine-tuning approach updates the entire parameter space which is inefficient in computation and memory. Thus we propose an efficient weight-preserving model adaption approach, where the original pre-trained model parameters $\Phi_0$, are kept, to learn an additional task-specified small-size of parameter set $\Theta$, $|\Theta|>>\Phi_0$, without degrading the performance in comparison to full model fine-tuning.

$$\Theta' = \text{argmax}_{\Theta}\sum_{i=1}^{N}\sum_{t=1}^{|y_i|}\log p_{(\Theta,\Phi_G)}(y_{i,t} \mid x_i,\, y_i,\, <t) \tag{2}$$

A typical neural network contains numerous dense layers that perform matrix multiplication. The weight matrices in these layers are typically allowed to have full-rank. However, pre-trained models' subsequent updates tend to be rank-deficient and can still learn efficiently despite a low-rank reparametrization. Leveraging the rank-deficiency of the updates to pretrained models, a rank-deficiency constraint is placed on the updates to the weights. For a pre-trained weight matrix $W \in \mathbb{R}^{d \times d}$ the rank-deficiency constraint is achieved by representing the update matrices with their rank decomposition $\Delta W = AB$, where $\Delta W \in \mathbb{R}^{d \times d}$, $A \in \mathbb{R}^{d \times r}$, and rank $r << d$. During training, W is fixed and does not receive gradient updates, while A and B are treated as trainable parameters. Both W and ΔW are multiplied to the same input, and their respective output vectors are summed coordinate-wise. For $f(x)=Wx$, our modified forward pass yields:

$$f(x)=Wx+\Delta Wx=Wx+ABx \tag{3}$$

At initialization, B is set to zero to recover the pre-trained model's forward pass. This allows the training to proceed stably from the beginning. Weight Decay to Pre-trained Weights Weight decay is often used as a form of regularization for overparametrized models. Intuitively, it gently "drags" the weights back to zero, thus preventing certain weight coordinates from becoming too large or overfitting. When adapting a large pre-trained model to a particular task, a common failure mode is "catastrophic forgetting", in which the model drifts too far away from its original weights and loses its general domain knowledge. Performing weight decay back to the pre-trained weights directly mitigates this. However, this usually requires storing the original weights during fine-tuning, which introduces significant memory overhead. In parametrization, this can be trivially achieved by performing weight decay on ΔW in the usual way, namely decaying back to zero.

In one implementation, the simple factorization can be applied to every dense layer using a random Gaussian initialization for A and zero for B, so ΔW is zero at the beginning of training.

VWx is scaled by $$\frac{\alpha}{r}$$

where α is a width-agnostic hyperparameter that controls the effective learning rate ratio between A and B. During deployment, the original weight matrix W can be replaced with W+AB and used to perform inference as usual. The replacement does not introduce any additional latency overhead, unlike some prior works. To switch to another task, W may be recovered simply by subtracting AB and then add A'B': $f(x)=Wx+ABx=(W+AB)x=W'xW'=W+AB$. The recovery causes a minor increase in peak memory usage and adds a latency to model switching that does not exceed a single model forward pass. No additional latency is introduced during inference in return.

Figure 2:
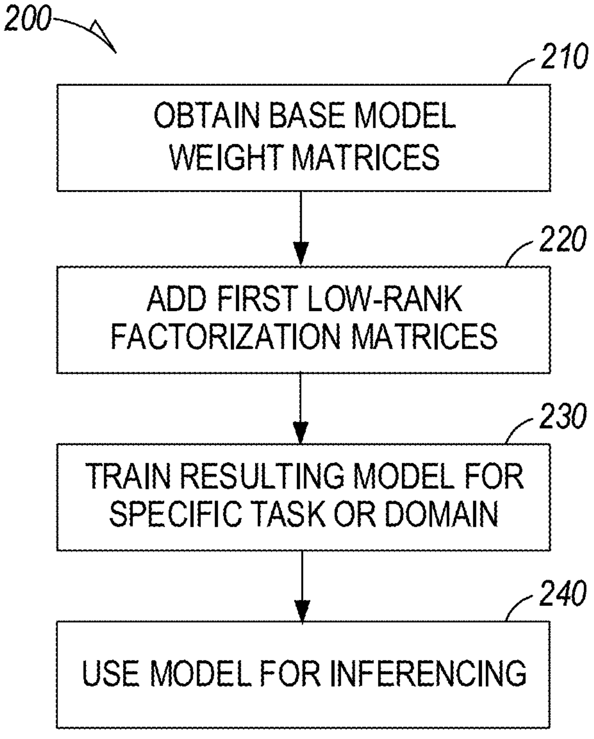
FIG. 2 is a flowchart illustrating computer implemented method of adapting a base model to a domain specific task according to an example embodiment.

FIG. 2 is a flowchart illustrating computer implemented method 200 of adapting a base model to a domain specific task according to an example embodiment. Method 200 begins with operation 210 by obtaining neural network-based language model base model weight matrices for each of multiple neural network layers. First low-rank factorization matrices treated as trainable parameters are added to the base model weight matrices at operation 220 to form a first domain language model. In one example, the first low-rank factorization matrices comprise a first matrix of size d×r stacked with a second matrix of size r×d, wherein r is significantly less than d, and wherein d is the length of an input. The base model weight matrices have dimensions of d×d.

The first domain language model is trained at operation 230 with first domain specific training data without modifying base model weight matrices. Training may include the use of a loss function using standard backpropagation, calculating a gradient for every parameter and updating weights by subtracting the gradients.

At operation 240, inferencing on first domain language input is performed using the trained first domain language model that includes the base model weight matrices and corresponding first low-rank factorization matrices. Operation 240 may be performed by using the base model weight matrices and corresponding first low-rank factorization matrices in parallel. In further examples, the base model weight matrices and corresponding first low-rank factorization matrices may be combined to perform inferencing.

Figure 3:
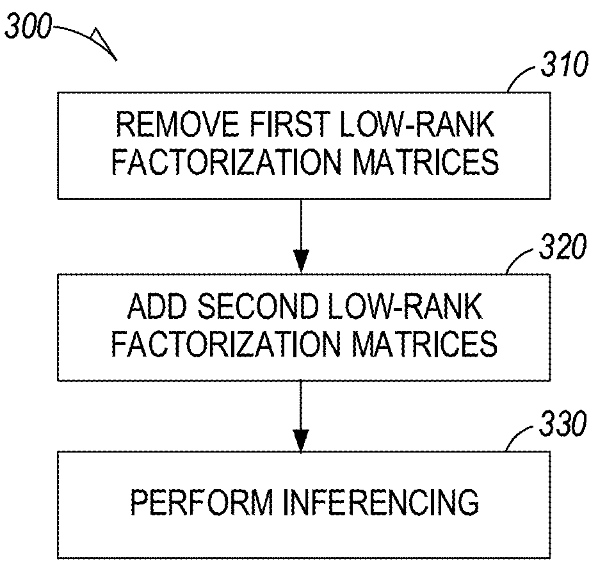
FIG. 3 is a flowchart illustrating a method 300 of switching between domain models that utilize low-rank factorization matrices according to an example embodiment.

FIG. 3 is a flowchart illustrating a method 300 of switching between domain models that utilize low-rank factorization matrices. Method 300 begins with removing the first low-rank factorization matrices at operation 310. Second low-rank factorization matrices are added to the base model weight matrices at operation 320. The second low-rank factorization matrices were obtained in a manner similar first low-rank factorization matrices by training with second domain specific training data without modifying base model weight matrices.

Operation 330 performs inferencing on second domain language input using the base model weight matrices and corresponding second low-rank factorization matrices. The inferencing may be performed based on combining the base model weight matrices and corresponding second low-rank factorization matrices.

Figure 4:
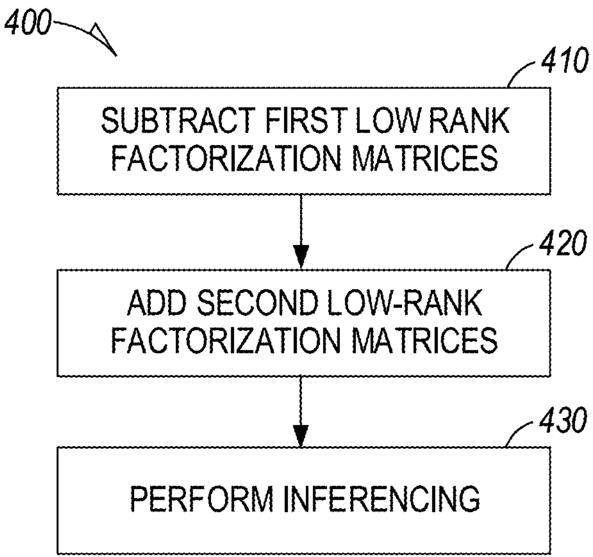
FIG. 4 is a flowchart illustrating a computer implemented method of switching between domain models that utilize low-rank factorization matrices that have been combined as opposed to being used in parallel according to an example embodiment.

FIG. 4 is a flowchart illustrating a computer implemented method 400 of switching between domain models that utilize low-rank factorization matrices that have been combined as opposed to being used in parallel. Method 400 begins by removing the first low-rank factorization matrices at operation 410 by subtracting them from the combined base model weight matrices and corresponding first low-rank factorization matrices. At operation 420, second low-rank factorization matrices are added to the base model weight matrices. The second low-rank factorization matrices are treated as trainable parameters that are trained with second domain specific training data without modifying base model weight matrices.

Method 400 may include performing inferencing on second domain language input using the base model weight matrices and corresponding second low-rank factorization matrices.

One example use of adaptation matrices is in the provision of a services via computing resources, such as cloud-based computing resources. The service may start with a general-purpose machine learning model, usually very large, trained on public or private data. The model contains general knowledge, e.g., that of the English language in the case of NLP, or that of useful visual features in the case of computer vision. However, such general knowledge cannot be readily used to solve tasks besides what the model was trained for, e.g., language modeling or image classification.

The service asks the user to define a task by providing a number of examples, which may be used directly or after data augmentation for training a LoRA module. Each task produces a single LoRA module, which usually occupies much less space than the pre-trained model.

During deployment, the service loads the pre-trained model into memory and store (potentially hundreds of) LoRA modules, each corresponding to a particular task, on stand-by. A task can also be specialized to different customers and stores in different LoRA modules. Switching between tasks is as simple as swapping the LoRA module in use, which can be done very efficiently. Swapping of LoRA modules provides comparable or even better performance than fine-tuning the entire model as done conventionally, in which case task-switching becomes prohibitively resource-intensive and slow.

Artificial intelligence (AI) is a field concerned with developing decision making systems to perform cognitive tasks that have traditionally required a living actor, such as a person. Artificial neural networks (ANNs) are computational structures that are loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers do not generally know which weights will work for a given application. Instead, a training process is used to arrive at appropriate weights. ANN designers typically choose a number of neuron layers or specific connections between layers including circular connection, but the ANN designer does not generally know which weights will work for a given application. Instead, a training process generally proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value, or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs.

Figure 5:
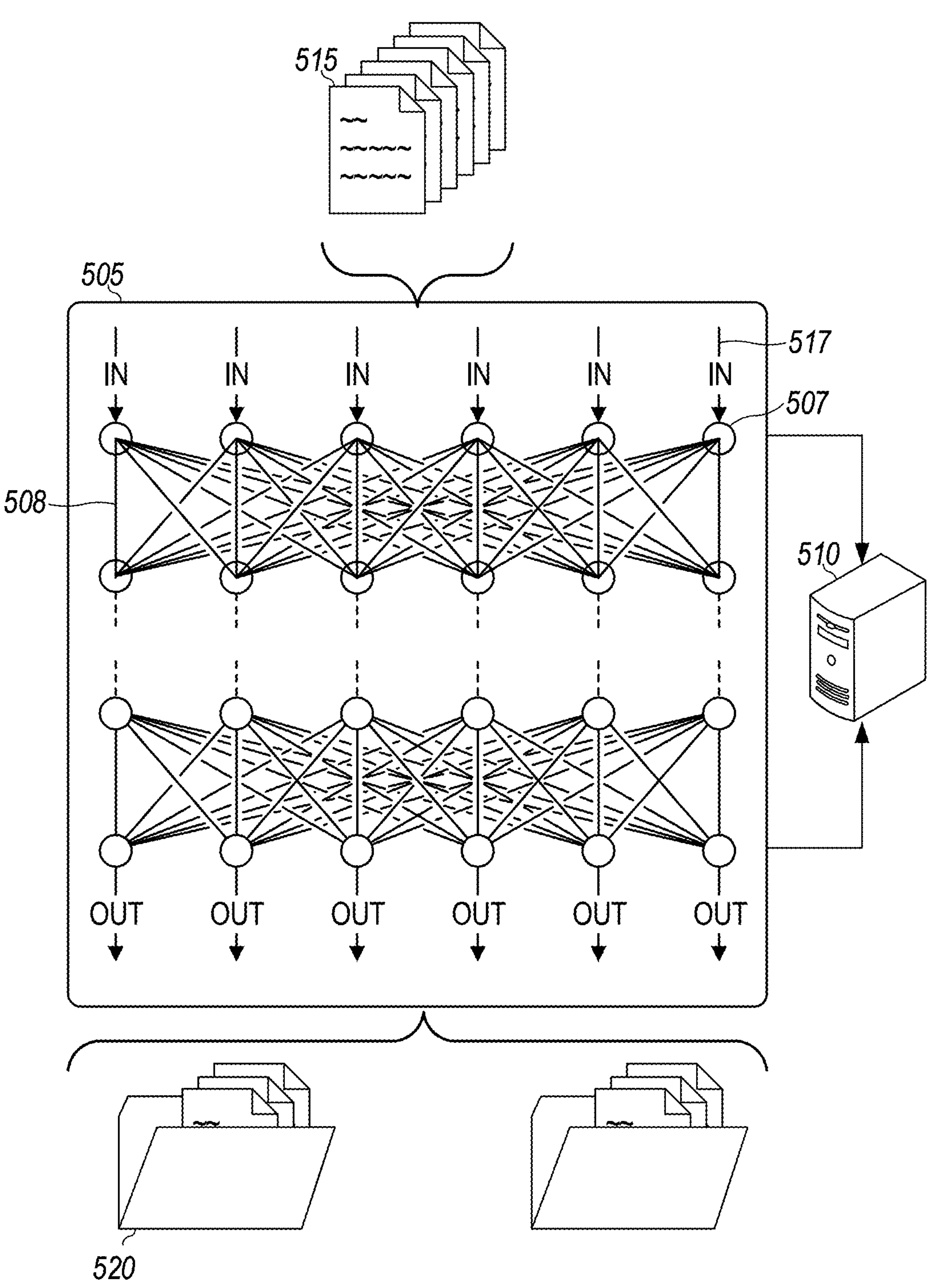
FIG. 5 is a block diagram of an example of an environment including a system for neural network training, according to an embodiment.

FIG. 5 is a block diagram of an example of an environment including a system for neural network training, according to an embodiment. The system includes an ANN 505 that is trained using a processing node 510. The processing node 510 may be a CPU, GPU, field programmable gate array (FPGA), digital signal processor (DSP), application specific integrated circuit (ASIC), or other processing circuitry. In an example, multiple processing nodes may be employed to train different layers of the ANN 505, or even different nodes 507 within layers. Thus, a set of processing nodes 510 is arranged to perform the training of the ANN 505. Each of the layers of the ANN 505 may utilize a pretrained weights 110 matrix with pairs of rank decomposition matrices 125 and 130 trained for various tasks or domains. The parameters of each of the matrices in each layer will be different.

The set of processing nodes 510 is arranged to receive a training set 515 for the ANN 505. The ANN 505 comprises a set of nodes 507 arranged in layers (illustrated as rows of nodes 507) and a set of inter-node weights 508 (e.g., parameters) between nodes in the set of nodes. In an example, the training set 515 is a subset of a complete training set. Here, the subset may enable processing nodes with limited storage resources to participate in training the ANN 505.

The training data may include multiple numerical values representative of a domain, such as red, green, and blue pixel values and intensity values for an image or pitch and volume values at discrete times for speech recognition. Each value of the training data, or input 517 to be classified once ANN 505 is trained, is provided to a corresponding node 507 in the first layer or input layer of ANN 505. The values propagate through the layers and are changed by the objective function. As noted above, the set of processing nodes is arranged to train the neural network to create a trained neural network. Once trained, data input into the ANN will produce valid classifications 520 (e.g., the input data 517 will be assigned into categories), for example. The training performed by the set of processing nodes 507 is iterative. In an example, each iteration of the training the neural network is performed independently between layers of the ANN 505. Thus, two distinct layers may be processed in parallel by different members of the set of processing nodes. In an example, different layers of the ANN 505 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes

507 (e.g., neurons) are trained independently. In an example, the nodes are trained on different hardware.

Figure 6:
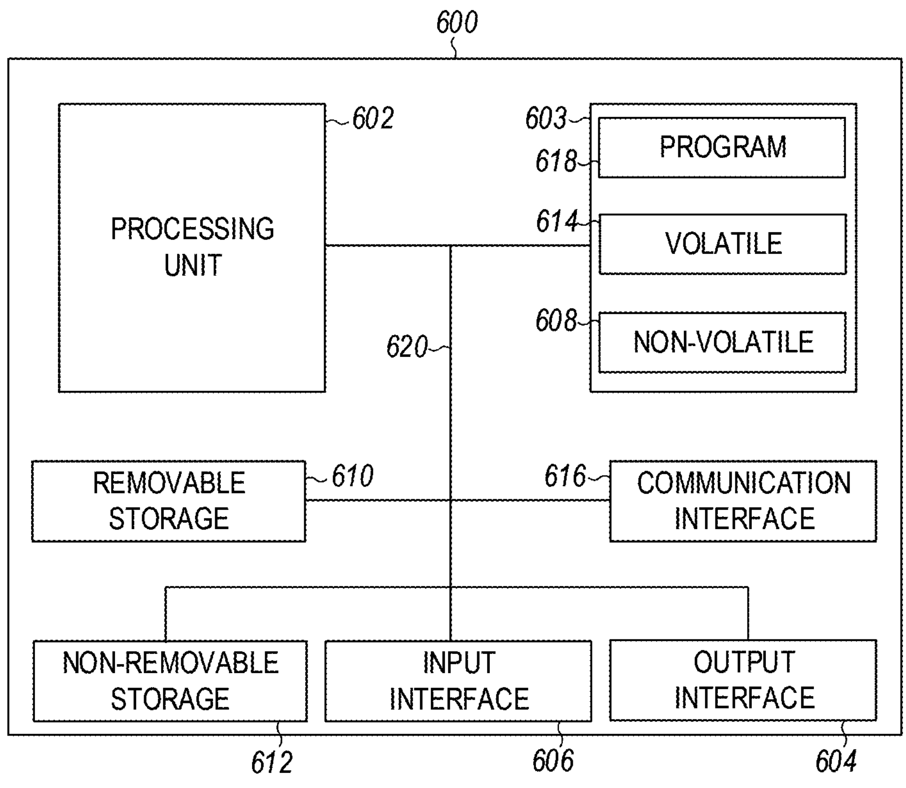
FIG. 6 is a block schematic diagram of a computer system to implement one or more example embodiments.

FIG. 6 is a block schematic diagram of a computer system 600 for modifying base models using low-rank factorization matrices and for performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A computer implemented method includes obtaining neural network-based model base model weight matrices for each of multiple neural network layers, adding, to the base model weight matrices, corresponding first low-rank factorization matrices treated as trainable parameters to form a first domain model, and training the first domain model with first domain specific training data without modifying base model weight matrices.
2. The method of claim 1 and further including performing inferencing on first domain input using the trained first domain model that includes the base model weight matrices and corresponding first low-rank factorization matrices.
3. The method of claim 2 wherein performing inferencing comprises using the base model weight matrices and corresponding first low-rank factorization matrices in parallel.
4. The method of any of claims 1-3 wherein the first low-rank factorization matrices comprise a first matrix of size d×r stacked with a second matrix of size r×d, wherein r is significantly less than d, and wherein d is the length of an input.
5. The method of claim 4 wherein the base model weight matrices have dimensions of d×d.
6. The method of any of claims 1-5 and further including removing the first low-rank factorization matrices and adding to the base model weight matrices, corresponding second low-rank factorization matrices treated as trainable parameters that are trained with second domain specific training data without modifying base model weight matrices.
7. The method of claim 6 and further including performing inferencing on second domain input using the base model weight matrices and corresponding second low-rank factorization matrices.
8. The method of claim 7 wherein performing inferencing comprises combining the base model weight matrices and corresponding second low-rank factorization matrices to perform inferencing.
9. The method of any of claims 1-8 and further including removing the first low-rank factorization matrices by subtracting them from the combined base model weight matrices and corresponding first low-rank factorization matrices, and adding to the base model weight matrices, corresponding second low-rank factorization matrices treated as trainable parameters that are trained with second domain specific training data without modifying base model weight matrices.
10. The method of claim 9 and further comprising performing inferencing on second domain input using the base model weight matrices and corresponding second low-rank factorization matrices.
11. A machine-readable storage device has instructions for execution by a processor of a machine to cause the processor to perform operations to perform a method. The operations include obtaining neural network-based model base model weight matrices for each of multiple neural network layers, adding, to the base model weight matrices, corresponding first low-rank factorization matrices treated as trainable parameters to form a first domain model, and training the first domain model with first domain specific training data without modifying base model weight matrices.

12. The device of claim 11 wherein the operations further include performing inferencing on first domain input using the trained first domain model that includes the base model weight matrices and corresponding first low-rank factorization matrices.

13. The device of claim 12 wherein performing inferencing includes using the base model weight matrices and corresponding first low-rank factorization matrices in parallel.

14. The device of any of claims 11-13 wherein the first low-rank factorization matrices include a first matrix of size d×r stacked with a second matrix of size r×d, wherein r is significantly less than d, and wherein d is the length of an input and wherein the base model weight matrices have dimensions of d×d.

15. The device of any of claims 11-14 wherein the operations further include removing the first low-rank factorization matrices and adding to the base model weight matrices, corresponding second low-rank factorization matrices treated as trainable parameters that are trained with second domain specific training data without modifying base model weight matrices.

16. The device of claim 15 wherein the operations further include performing inferencing on second domain input using the base model weight matrices and corresponding second low-rank factorization matrices.

17. The method of claim 16 wherein performing inferencing includes combining the base model weight matrices and corresponding second low-rank factorization matrices to perform inferencing.

18. The method of any of claims 11-17 wherein the operations further include removing the first low-rank factorization matrices by subtracting them from the combined base model weight matrices and corresponding first low-rank factorization matrices, and adding to the base model weight matrices, corresponding second low-rank factorization matrices treated as trainable parameters that are trained with second domain specific training data without modifying base model weight matrices.

19. A device includes a processor and a memory device coupled to the processor and having a program stored thereon for execution by the processor to perform operations. The operations include obtaining neural network-based model base model weight matrices for each of multiple neural network layers, adding, to the base model weight matrices, corresponding first low-rank factorization matrices treated as trainable parameters to form a first domain model, and training the first domain model with first domain specific training data without modifying base model weight matrices.

20. The device of claim 19 wherein the first low-rank factorization matrices include a first matrix of size d×r stacked with a second matrix of size r×d, wherein r is significantly less than d, and wherein d is the length of an input and wherein the base model weight matrices have dimensions of d×d, and wherein the operations further include removing the first low-rank factorization matrices and adding to the base model weight matrices, corresponding second low-rank factorization matrices treated as trainable parameters that are trained with second domain specific training data without modifying base model weight matrices.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:

obtaining deep learning transformer multiple layer neural network-based general domain trained language model base model weight matrices having a first dimension for each of multiple neural network layers;

injecting a pair of low-rank adaptation matrices having an intermediate second dimension less than the first dimension into the base model weight matrices where the pair of rank adaptation matrices are treated as trainable parameters to form a first domain specific model without modifying the base model weight matrices; and training the first domain model with first domain specific training data to modify weights of the pair of low-rank adaptation matrices to indirectly train each base model layer by optimizing rank decomposition of the pair of low-rank adaptation matrices without modifying base model weight matrices.

2. The method of claim 1 and further comprising performing inferencing on first domain input using the trained first domain model that includes the base model weight matrices and corresponding pair of low-rank adaptation matrices.

3. The method of claim 2 wherein performing inferencing comprises using the base model weight matrices and corresponding pair of low-rank adaptation matrices in parallel.

4. The method of claim 1 wherein the pair of low-rank adaptation matrices comprise a first matrix of size d×r stacked with a second matrix of size r×d, wherein r is one-percent or less of d, and wherein d is a length of an input.

5. The method of claim 4 wherein the base model weight matrices have dimensions of d×d.

6. The method of claim 1 and further comprising:

removing the pair of low-rank adaptation matrices; and adding to the base model weight matrices, a second pair of low-rank adaptation matrices treated as trainable parameters that are trained with second domain specific training data without modifying base model weight matrices.

7. The method of claim 6 and further comprising performing inferencing on second domain input using the base model weight matrices and the second pair of low-rank adaptation matrices.

8. The method of claim 7 wherein performing inferencing comprises combining the base model weight matrices and corresponding second pair of low-rank adaptation to perform inferencing.

9. The method of claim 1 and further comprising:

removing the pair of low-rank adaptation matrices by subtracting them from the base model weight matrices and corresponding pair of low-rank adaptation matrices; and adding to the base model weight matrices, a second pair of low-rank adaptation matrices treated as trainable parameters that are trained with second domain specific training data without modifying base model weight matrices.

10. The method of claim 9 and further comprising performing inferencing on second domain input using the base model weight matrices and the second pair of low-rank adaptation matrices.

11. A machine-readable storage device having instructions for execution by a processor of a machine to cause the processor to perform operations to perform a method, the operations comprising:

obtaining deep learning transformer multiple layer neural network-based general domain trained language model base model weight matrices having a first dimension for each of multiple neural network layers;

injecting a pair of low-rank adaptation matrices having an intermediate second dimension less than the first dimension into the base model weight matrices where the pair of rank adaptation matrices are treated as trainable parameters to form a first domain specific model without modifying the base model weight matrices; and training the first domain model with first domain specific training data to modify weights of the pair of low-rank adaptation matrices to indirectly train each base model layer by optimizing rank decomposition of the pair of low-rank adaptation matrices without modifying base model weight matrices.

12. The device of claim 11 wherein the operations further comprise performing inferencing on first domain input using the trained first domain model that includes the base model weight matrices and corresponding pair of low-rank adaptation matrices.

13. The device of claim 12 wherein performing inferencing comprises using the base model weight matrices and corresponding pair of low-rank adaptation matrices in parallel.

14. The device of claim 11 wherein the pair of low-rank factorization matrices comprise a first matrix of size d×r stacked with a second matrix of size r×d, wherein r is one-percent or less of d, and wherein d is a length of an input.

15. The device of claim 11 wherein the operations further comprise:

removing the pair of low-rank adaptation matrices; and adding to the base model weight matrices, a second pair of low-rank adaptation matrices treated as trainable parameters that are trained with second domain specific training data without modifying base model weight matrices.

16. The device of claim 15 wherein the operations further comprise performing inferencing on second domain input using the base model weight matrices and the second pair of low-rank adaptation matrices.

17. The method of claim 16 wherein performing inferencing comprises combining the base model weight matrices and corresponding second pair of low-rank adaptation to perform inferencing.

18. The method of claim 11 wherein the operations further comprise:

removing the pair of low-rank adaptation matrices by subtracting them from the base model weight matrices and corresponding pair of low-rank adaptation matrices; and adding to the base model weight matrices, a second pair of low-rank adaptation matrices treated as trainable parameters that are trained with second domain specific training data without modifying base model weight matrices.

19. A device comprising:

a processor; and a memory device coupled to the processor and having a program stored thereon for execution by the processor to perform operations comprising:

obtaining deep learning transformer multiple layer neural network-based general domain trained language model base model weight matrices having a first dimension for each of multiple neural network layers;

injecting a pair of low-rank adaptation matrices having an intermediate second dimension less than the first dimension into the base model weight matrices where the pair of rank adaptation matrices are treated as trainable parameters to form a first domain specific model without modifying the base model weight matrices; and training the first domain model with first domain specific training data to modify weights of the pair of low-rank adaptation matrices to indirectly train each base model layer by optimizing rank decomposition of the pair of low-rank adaptation matrices without modifying base model weight matrices.

20. The device of claim 19 wherein r is one-percent or less of d, and wherein d is a length of an input and wherein the base model weight matrices have dimensions of d×d, and wherein the operations further comprise:

removing the pair of low-rank adaptation matrices; and adding to the base model weight matrices, a second pair of low-rank adaptation matrices treated as trainable parameters that are trained with second domain specific training data without modifying base model weight matrices.

* * * * *